Figure 1:
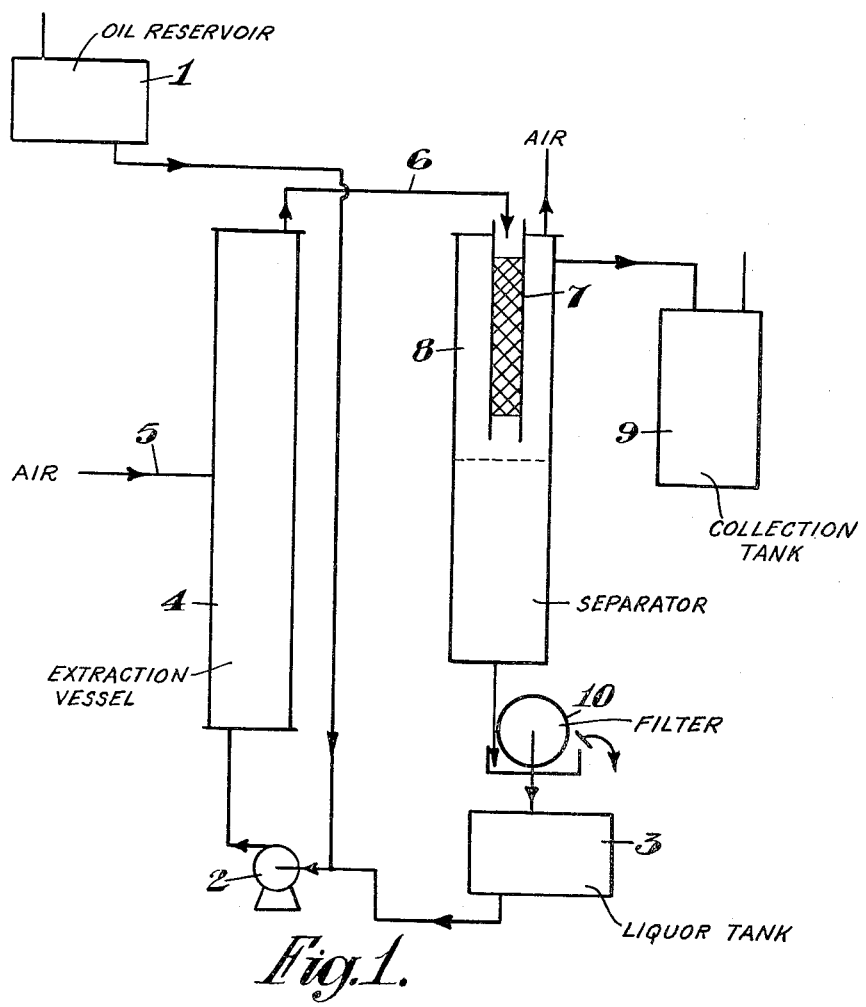

United States Patent Office 2,997,439
Patented Aug. 22, 1961

2,997,439
REMOVAL OF HYDROGEN SULPHIDE FROM HYDROCARBONS WITH ANTHRAQUINONE DISULFONIC ACIDS
Thomas Nicklin, Davyhulme, Manchester, Anthony W. Sommerville, Whalley Range, Manchester, Ernest Brunner, Wilmslow, and Robert Isherwood, Sale, England, assignors to North Western Gas Board, Manchester, England, a British corporation, and The Clayton Aniline Company Limited, Manchester, England, a British company
Filed May 3, 1960, Ser. No. 26,613
Claims priority, application Great Britain May 14, 1959
9 Claims. (Cl. 208—231)

This invention relates to the removal of hydrogen sulfide which is present in liquid hydrocarbons.

According to the invention, the liquid hydrocarbons are brought into contact with an aqueous washing liquid comprising an alkaline solution of one or more anthraquinone disulfonic acids, whereby the hydrogen sulfide is oxidised and sulfur is liberated, and the reduced anthraquinone disulfonic acid or acids is or are re-oxidized by means of free oxygen or a gas containing it.

All the known isomers of anthraquinone disulfonic acid are suitable for use in this process. These are:

Anthraquinone-1.5-disulfonic acid
Anthraquinone-1.6-disulfonic acid
Anthraquinone-1.7-disulfonic acid
Anthraquinone-1.8-disulfonic acid
Anthraquinone-2.6-disulfonic acid
Anthraquinone-2.7-disulfonic acid Also mixtures of these isomers may be used with advantage, including commercially available mixtures which contain 1.5/1.8- or 2.6/2.7-anthraquinone disulfonic acids and possibly small quantities of other isomers.

The aqueous washing solution has a pH of above 7, the preferred value being from 8.5 to 9.5. The desired pH value and total alkali concentration may be obtained by adding alkalis such as caustic soda, caustic potash, ammonia or sodium, potassium or ammonium carbonates or bicarbonates or organic bases such as alkanolamines.

The hydrocarbon liquid and the washing liquid may be passed in counter current through a scrubber. The used washing liquid may be fed together with air to the base of an oxidation tower, in which the material is fully oxidized preparatory to being re-circulated to the scrubber. Sulfur is liberated during the reduction of the anthraquinone compound by the hydrogen sulfide, and is removed from the liquor, e.g. by filtration, either before or after the solution has been regenerated.

Alternatively, the liquid to be purified and the washing liquid may be passed in co-current, with air or other oxidizing gas, through a mixing column in which a turbulent flow occurs. The mixture is then passed to a separator, in which gas is allowed to escape while the liquid to be purified and the washing liquid separate and can be withdrawn separately. The hydrocarbon liquid, now freed from hydrogen sulfide is withdrawn from the upper part of the separator, while the washing liquid, regenerated by means of the oxidizing gas, is drawn off from the lower part, together with the sulfur which is removed, e.g. by filtration, before the liquid is returned to the mixing column.

The process may be operated batchwise, the aqueous alkaline solution being reacted with the liquid hydrocarbon containing hydrogen sulfide until the hydrogen sulfide is completely removed, and depending on reaction conditions the whole or a part of the anthraquinone compound is wholly or partly reduced to the leuco state, after which the solution is regenerated with oxygen or a gas containing it. The precipitated sulfur may be removed either before or after the solution has been regenerated.

The anthraquinone disulfonic acids and mixtures thereof have the following properties which render them particularly advantageous for the purposes of the present invention.

(1) They are stable compounds which undergo substantially no decomposition under the conditions of application, as for instance in the presence of iron and alkali, and can be re-used indefinitely with little or no loss.
(2) They are non-toxic.
(3) They are soluble in water in both the oxidized and the reduced state.
(4) They are reasonable in cost.
(5) They have a speed of reaction in relation to both reduction and oxidation which is adequate to allow the process to be carried out economically.

By means of this process crude benzole or petroleum products containing hydrogen sulfide can be treated in one stage for the complete elimination of hydrogen sulfide. The process has the additional advantage over existing processes that sulfur is recovered in saleable form.

Figure 2:
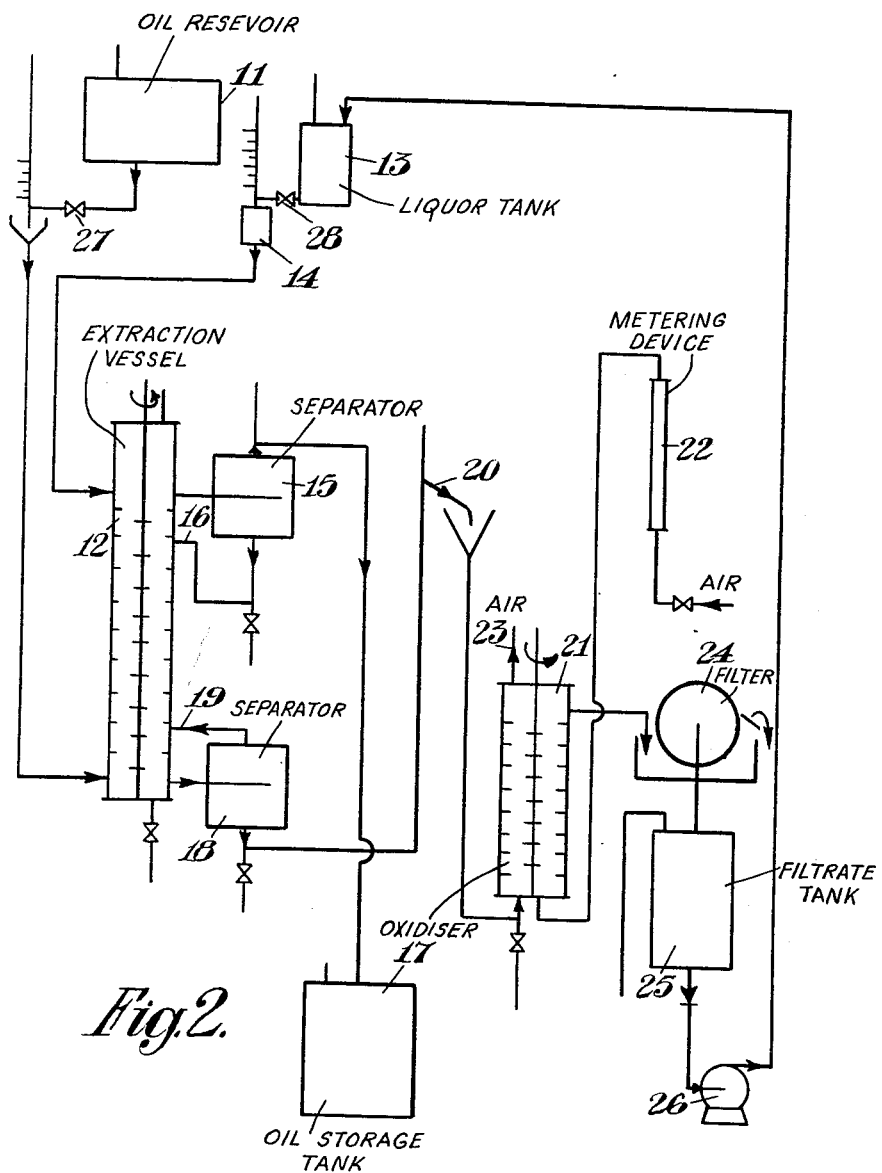

In the accompanying drawings,
FIGURE 1 illustrates diagrammatically a suitable arrangement of apparatus for carrying out the method according to the invention as described in Example 1 below.
FIGURE 2 shows diagrammatically another arrangement of apparatus suitable for carrying out the method described in Example 2.

The manner in which the invention is carried out is illustrated by the following examples.

*Example 1*

An apparatus is used as illustrated diagrammatically in FIGURE 1. A hydro-refined oil, initial hydrogen sulfied content 0.29% by weight is fed from a reservoir 1 to the inlet of a pump 2, to which is fed also a purification liquor consisting, per 100 parts by weight, of 0.5 part of a commercial anthraquinone disulfonic acid (58% 1.5-anthraquinone disulfonic acid, 29% 1.8-anthraquinone disulfonic acid, 2.4% 1.6-anthraquinone disulfonic acid, and 10.6% 1.7-anthraquinone disulfonic acid) and 98.5 parts of water, adjusted to pH 9 by addition of 1 part of alkali (sodium carbonate/sodium bicarbonate). This liquor is supplied from a tank 3. The pump 2 delivers the mixture of oil and liquor to an extraction vessel 4 in which it flows upwards in a turbulent manner while the reaction takes place whereby hydrogen sulfide is absorbed and oxidized with liberation of sulfur and anthraquinone disulfonic acid is reduced. Air is admitted to the vessel 4 at 5, and in the upper part of the vessel 4 the anthraquinone disulfonic acid is re-oxidized.

The mixture then passes through a pipe 6 to a packed column 7 arranged in the upper part of a separator 8. In the column 7, the air escapes and the mixture breaks down, and in the separator 8 the oil and aqueous phases separate. The purified oil passes from the top of the separator 8 to a collection vessel 9, while the liquor passes from the bottom of the separator to a rotary vacuum filter 10 where the sulfur is removed the liquor then passing to the tank 3.

The materials are supplied in the relative proportions of three volumes of air and two volumes of aqueous liquor to one volume of oil, the rate of flow being such that there is no hydrogen sulfide present in the oil in the vessel 9.

*Example 2*

An apparatus is used as shown diagrammatically in FIGURE 2. A middle distillate oil containing 0.06% hydrogen sulfide is supplied from a reservoir 11 to the bottom of a counter-current extraction vessel 12 of the kind usually referred to as a rotating disc contractor, and a purification liquor containing per 100 parts by weight, 0.5 part anthraquinone 2.6/2.7-disulfonic acid disodium salt, 3 parts sodium carbonate and sufficient boric acid to reduce the pH to 9, the remainder being water, is supplied from a tank 13 to the top of the vessel 12 through a sight tube 14. The oil leaves the vessel 12 at the top and enters a separator 15, any entrained aqueous liquor being separated out or returned to the vessel 12 at 16, while the oil goes forward to a storage tank 17. The liquor leaves the vessel 12 at the bottom and enters a separator 18 where entrained oil is separated to be returned to the vessel 12 at 19, the liquor passing by way of an overflow pipe 20 to a rotating disc contactor 21 serving as an oxidizer. Air is blown in to the oxidizer through a metering deveice 22, and leaves the oxidizer at 23. Liquor leaving the oxidizer 21 goes to a vacuum filter 24 for removal of sulfur, and from the filtrate receiver 25 it is fed back to the tank 13 by a pump 26. Valves 27 and 28 enable the flow of oil and liquor to be regulated.

The flow of oil is adjusted so that the oil passing into the tank 17 is free from hydrogen sulfide. The volume of liquor required is twice the volume of oil, and the amount of air required for regeneration of the liquor is three times the volume of oil.

*Example 3*

An oil as in Example 2 is treated in an apapratus as shown in FIGURE 2, with a liquor containing, per 100 parts by weight, 0.2 part of anthraquinone-2.6/2.7 disulfonic acid disodium salt, 2 parts borax, and sufficient boric acid to reduce the pH to 8.8, the remainder being water. The relative rates of flow are in Example 2.

*Example 4*

Crude benzole containing 0.05% hydrogen sulfide is treated in an apparatus as shown in FIGURE 2, with a liquor containing per 100 parts by weight, 0.5 part anthraquinone-2.6/2.7-disulfonic acid disodium salt, 3 parts sodium carbonate and sufficient acetic acid to reduce the pH to 8.8, the remainder being water. The materials are supplied in the proportions of three volumes of air and one volume of aqueous liquor to one volume of benzole, the rate of flow being such that the treated benzole contains no hydrogen sulfide.

What is claimed is:

1. A process for the removal of hydrogen sulfide from liquid hydrocarbons, in which the liquid hydrocarbons are brought into contact with an aqueous washing liquid comprising an alkaline solution of at least one anthraquinone disulfonic acid, whereby the hydrogen sulfide is oxidized and sulfur is liberated, and the reduced anthraquinone disulfonic acid is re-oxidized by means of a gas consisting at least in part of free oxygen.

2. A process as claimed in claim 1, in which a solution of a mixture of isomeric anthraquinone disulfonic acids is used.

3. A process as claimed in claim 2 in which a solution of a mixture containing 2.6- and 2.7-anthraquinone disulfonic acids is used.

4. A process as claimed in claim 2, in which a solution of a mixture containing 1.5- and 1.8-anthraquinone disulfonic acids is used.

5. A process as claimed in claim 1, in which the solution is brought to the desired pH value above 7 by the addition of a substance selected from the group consisting of alkalies and organic bases.

6. A process as claimed in claim 1, in which the solution is passed through a filter for removing liberated sulfur.

7. A process as claimed in claim 1, in which the hydrocarbon liquid and the washing liquid are passed in counter-current through a scrubber, and the used washing liquid is fed with a gas consisting at least in part of free oxygen to an oxidation tower in which the material is oxidized preparatory to being recirculated to the scrubber.

8. A process as claimed in claim 1, in which the hydrocarbon liquid and the washing liquid are passed in co-current through a mixing column, to which a gas consisting at least in part of free oxygen is supplied and in which a turbulent flow occurs.

9. A process as claimed in claim 1, in which at least a part of the material, of which the apparatus used for carrying out the process is constructed and with which the solution comes into contact, consists of iron.

References Cited in the file of this patent

UNITED STATES PATENTS

| | | |
|---|---|---|
| 1,870,249 | Gublemann et al. | Aug. 9, 1932 |
| 2,739,101 | Gordon et al. | Mar. 20, 1956 |
| 2,897,140 | Gislon et al. | July 28, 1959 |